United States Patent [19]
Garber

[11] Patent Number: 4,803,007
[45] Date of Patent: Feb. 7, 1989

[54] CORROSION INHIBITOR FOR SALT-BASED DEICING COMPOSITIONS

[76] Inventor: Frank R. Garber, 137 Canterbury Rd., Circle Pines, Minn. 55014

[21] Appl. No.: 109,486

[22] Filed: Oct. 16, 1987

[51] Int. Cl.$^4$ ................................................. C09K 3/18
[52] U.S. Cl. ..................................... 252/70; 252/387; 252/389.2
[58] Field of Search ........................ 252/70, 387, 389.2

[56] References Cited

U.S. PATENT DOCUMENTS

| | | | |
|---|---|---|---|
| 2,742,369 | 4/1956 | Hatch | 352/389.2 |
| 2,813,075 | 11/1957 | Brooke | 252/387 |
| 2,980,620 | 4/1961 | Hatch | 252/387 |
| 3,185,648 | 5/1965 | Standish et al. | 252/70 |
| 3,284,368 | 11/1966 | Hatch | 252/389 |
| 3,445,395 | 5/1969 | Boehmer | 252/75 |
| 3,505,234 | 4/1970 | Pinckernelle et al. | 252/70 |
| 3,510,436 | 5/1970 | Silverstein et al. | 252/389 |
| 3,542,686 | 11/1970 | Miller | 252/70 |
| 3,580,855 | 5/1971 | Mickus et al. | 252/181 |
| 3,668,132 | 6/1972 | Finder | 252/80 |
| 3,669,616 | 6/1972 | Murray et al. | 21/2.7 |
| 3,669,901 | 6/1972 | Murray | 252/387 |
| 3,887,488 | 6/1975 | Scott et al. | 252/389 A |
| 4,089,651 | 5/1978 | Scott | 21/2.7 R |
| 4,512,915 | 4/1985 | Lumaret et al. | 252/309 A |

FOREIGN PATENT DOCUMENTS 1328509 8/1973 United Kingdom.

OTHER PUBLICATIONS

O. Lahodny-Sarc et al., *Corrosion Science*, 16, 25 (1976).
R. R. Bishop, TRRL Report LR 489, Crowthorne, England (1982).
R. R. Bishop, *Materials Performance*, 15 (Nov. 1976).
U. R. Evans, "The Corrosion and Oxidation of Metals: Scientific Principles and Practical Applications," Edward Arnold, London (1960) at pp. 135–319, 164–169.
D. E. Steed, RRL Report LP 268, Crowthorne, England (1969).

*Primary Examiner*—Robert A. Wax
*Attorney, Agent, or Firm*—Merchant, Gould, Smith, Edell, Welter & Schmidt

[57] ABSTRACT

A deicing composition is provided which comprises a solid mixture of sodium chloride and a corrosion inhibitor comprising a water-soluble divalent metal ion and an alkali metal polyphosphate selected from the group consisting of tripolyphosphate, pyrophosphate, hexametaphosphate and mixtures thereof, wherein the inhibitor is present in an amount effective to reduce the rate of corrosion of ferrous metals by aqueous sodium chloride solutions.

11 Claims, No Drawings

CORROSION INHIBITOR FOR SALT-BASED DEICING COMPOSITIONS

BACKGROUND OF THE INVENTION

Salt (NaCl) is the chemical which is most commonly employed to deice roads, driveways, sidewalks and the like. Salt is as low as, or lower in cost, than any other chemical which is presently available for use as a deicer. The reasons for this are its high weight efficiency as a deicer and its wide availability in a purity which is sufficient for use after minimal processing.

The costs associated with purchasing and applying ground "rock salt" are misleading with respect to the total cost of this material as a road deicer. The aqueous solutions of sodium chloride which result from melting ice and snow severely damage vehicles and highway structures by corrosion of their metal parts, and harm flora, fauna, soil and water supplies. The Environmental Protection Agency has released data suggesting that the cost of this damage is fourteen times the direct cost of deicing with sodium chloride. D. M. Murray et al., *An Economic Analysis of the Environmental Impact of Highway Deicing*, U.S. Environmental Protection Agency, Cincinnati, Ohio, EPA-600/a-76-105 (May 1976).

When a ferrous metal is contacted with aerated water which is slightly acid to slightly alkaline (pH 6.5–8.3) local anode and cathode sites develop on its surface. These sites or cells, formed as a result of impurities or intermolecular stresses in the iron, have a potential of $-0.41$ volt, which sponsors a current flow through the base metal and the electrolyte (water). At the anode, iron is converted from the metallic to the ionic state, while at the cathode either ionic hydrogen or dissolved oxygen is reduced, causing the surface of the cathode to become more alkaline. These reactions can be represented by the following formulas:

(A) (Anode reaction)

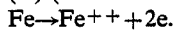
$Fe \rightarrow Fe^{++} + 2e$.

(B) (Cathode Reactions)

(1) Oxygen reduction $1/2O_2 + H_2O \rightarrow 2e. \rightarrow 2OH^-$ (2) Ion reduction $2e. + 2H_2O \rightarrow 2OH^- + H_2$ (C) (Combining of the two electrode products yields ferrous hydroxide), which is further oxidized to ferric hydroxide.

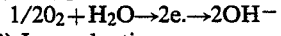
$Fe^{++} + 2HO^- \rightarrow Fe(OH)_2$

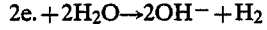
$2Fe(OH)_2 + 1/2O_2 + H_2O \rightarrow 2Fe(OH)_3$

The deposition of $Fe(OH)_2$ and $Fe(OH)_3$ at anodic sites leads to the tuberculation and pitting of the metal surface, and the spalling of concrete from highway structures. Deicing processes, using sodium chloride as the active ingredient, contribute to these corrosion-causing reactions by increasing the conductivity of the water formed from the melted snow or ice. The dissolved chloride ion also permeates the tubercules, thus increasing their conductivity and the overall corrosion rate.

Therefore, a need exists for a method to inhibit the metal corrosion and environmental damage caused by salt-based deicing compositions. A further need exists for a composition which is an effective deicer, but which is inhibited in its ability to corrode ferrous metals when dissolved in meltwater.

BRIEF DESCRIPTION OF THE INVENTION

The present invention is directed to a salt-based deicing composition and a method of its use, which substantially reduces the salt-enhanced corrosion of metal structures associated with roadways, sidewalks, vehicles and the like. The deicing composition of the invention comprises a solid mixture of sodium chloride and a corrosion inhibitor. The corrosion inhibitor comprises a source of water-soluble divalent metal ions and an alkali metal polyphosphate salt selected from the group consisting of tripolyphosphate, pyrophosphate or hexametaphosphate and mixtures thereof. The inhibitor, which is also an aspect of the invention, is combined with the salt (NaCl) in an amount which is effective to reduce the rate of corrosion of ferrous metals by aqueous sodium chloride solutions.

Therefore, deicing compositions falling within the scope of the present invention are those which include an amount of inhibitor which is effective to reduce the rate of ferrous metal corrosion caused by solutions of sodium chloride, such as result from the melting of a layer of ice or snow following the application of a salt-containing deicer. The increase in the rate of ferrous metal corrosion by water due to dissolved sodium chloride plateaus and about 2-3 wt-% sodium chloride. Therefore, exposure of steel strips to solutions of 2-3% NaCl, with or without added inhibitor, provides a reliable assay of the ability of the inhibitor to block or reduce the corrosive effects of aqueous NaCl.

Since the inhibitors of the present invention also function to reduce the melting point of ice, the present composition remains highly effective as a deicer. Furthermore, the preferred inhibitors also act to reduce roadside plant damage.

Although not intending to be bound by any theory of operation, it is believed that under the conditions of application, the resultant solutions of tripolyphosphate, pyrophosphate and/or hexametaphosphate resist reversion to orthophosphate until the solubilized polyphosphate reaches the metal surface. The high pHs present near the metal surface, along with dissolved divalent metal ions, cause the reversion of the dissolved polyphosphate to orthophosphate, forming a coating of an insoluble divalent metal ion orthophosphate salt at the metal surface. The orthophosphate coats both corroded and uncorroded areas of the metal, thus reducing the corrosive effects of the aqueous salt, including tuberculation, pitting and spalling. The layer of orthophosphate is retained for a substantial period, and can act to reduce corrosion during nonapplication periods.

However, divalent metal orthophosphate salts are essentially insoluble in water. Therefore, the present deicing compositions are not formulated to include any significant amount of orthophosphate since it would not be expected to effectively migrate to and coat the metal surface.

Low levels of zinc and pyrophosphate or metaphosphate salts have been disclosed to inhibit the corrosion of iron and copper piping caused by water streams. For example, see U.S. Pat. Nos. 4,089,651 and 3,284,368. However, compositions comprising preformed blends of sodium chloride, divalent metal salts and polyphosphate salts are not suggested by such disclosures since it would be highly disadvantageous to add salt to a circulating or once-through water system.

All ratios or percentages used herein are ratios or percentages by weight of the composition or individual ingredient referred to, e.g., the NaCl.

DETAILED DESCRIPTION OF THE INVENTION

Divalent Metal Ion Salt

Useful sources of divalent metal ions are metal salts which are water-soluble to the extent that they provide a concentration of divalent metal ions, which interact with the polyphosphate to decrease the rate of the metal corrosion effects of sodium cloride solutions which are formed under deicing conditions. Useful divalent metal ions include the alkaline earth metal ions, e.g., calcium ($Ca^{+2}$), magnesium ($Mg^{+2}$), strontium ($Sr^{+2}$) and barium ($Ba^{+2}$); of which calcium and magnesium are preferred. Other useful divalent metal ions include zinc ($Zn^{+2}$), cobalt ($Co^{+2}$), copper ($Cu^{+2}$), iron ($Fe^{+2}$), manganese ($Mn^{+2}$) and tin ($Sn^2$), of which zinc is preferred, due to its low toxicity.

Suitable counterions for the divalent metal ions include halides, preferably chloride; bromate, iodate, oxide, sulfate, borate, stannate, metasilicate, nitrate, carbonate, acetate, lactate, gluconate, citrate and the like. Many useful divalent metal ion salts are commercially available, and can readily be selected and evaluated on the basis of their published or readily-determinable water solubilities. For example, divalent metal ion salts which are preferred due to their high water solubility and low toxicity include $CaCl_2$, $ZnSO_4$, $MgCl_2.6H_2O$ and $MgSO_4.7H_2O$.

Polyphosphate Salt

Useful polyphosphate salts include those inorganic phosphate or condensed phosphate salts which can revert to orthophosphate ($PO_4^{-3}$). These salts include the water-soluble ammonium or metal salts of tripolyphosphate ($P_3O_{10}^{-5}$), hexametaphosphate (($MPO_3)_x$, a mixture of polymeric metaphosphates, not a hexamer), and pyrophosphate ($P_2O_7^{-4}$). The alkali metal salts of these polyphosphates are preferred for use in the present inhibitors, most preferably sodium tripolyphosphate ($Na_5P_3O_{10}$), sodium hexametaphosphate (($NaPO_3)_x$, "sodium polymetaphosphate") and sodium pyrophosphate ($Na_4P_2O_7$).

Although the divalent metal ion and the polyphosphate are commonly provided as a mixture of their respective salts, i.e., as two compounds, the use of single water-soluble, complex salts comprising both a divalent metal ion and a polyphosphate as the source of both of these components, is within the scope of the present invention.

Formulation

The ratio of the soluble divalent metal ion salt to the polyphosphate salt can vary widely. For example, from about 0.1-99.9 wt-% of the soluble divalent metal ion salt can be combined with about 0.1-99.9 wt-% of the polyphosphate salt. For example, the weight ratio of metal ion salt to the polyphosphate salt can be 500-0.1:1; preferably about 100:0.25-1, and most preferably about 50:0.5-1. Experiments wherein the weight ratio of soluble $Ca^{+2}$, $Mg^{+2}$ or $Zn^{+2}$ salt to the alkali metal polyphosphate is about 30-1:1 have resulted in particularly high degrees of corrosion inhibition.

The effective weight ratio of the inhibitor mixture to salt can also vary widely, since the solid inhibitor mixture also can exhibit deicing properties. For example, $CaCl_2$ and a mixture of calcium and magnesium acetate have been used without salt as deicing compounds. Therefore, the present deicing compositions can contain from about 1-95 wt-% inhibitor in combination with about 5-99 wt-% salt.

However, due to the low cost of salt, it is preferred that salt be the major component of the present solid deicing compositions, and that the mixture of the soluble divalent metal ion salt and the polyphosphate salt be present in a minor amount, by weight. Therefore, the amount of the corrosion inhibitor included in the present deicing compositions will preferably comprise about 75-1 wt-%, preferably about 50-2 wt-% and most preferably about 30-5 wt-% of the total amount of salt.

Since the salt (NaCl), the water-soluble divalent metal ion salt and the polyphosphate salt are all commercially available as granular or powdered solids, the present deicing compositions can be prepared by combining the compounds in the desired weight ratio and blending them until a substantially homogeneous solid mixture is obtained. The resultant deicing mixture is applied to a structure coated with ice or snow by any conventional means, as by mechanical or manual scattering or spreading. The present composition can also be combined with conventional materials intended to increase vehicular or pedestrian traction, such as gravel, cinders and the like.

The invention will be further described by reference to the following detailed examples, wherein the term "salt" refers to sodium chloride (NaCl).

EXAMPLE I

Corrosion Inhibition by Zinc/Tripolyphosphate Mixtures

Plates ("coupons") of mild steel (1014, 12.7 cm×7.62 cm×0.16 cm) were suspended in stoppered flasks containing about 200 ml of aqueous solutions of NaCl ("salt"), containing varying amounts of zinc sulfate and sodium tripolyphosphate. The corrosion coupons were weighed before and after the test period, following nonabrasive removal of corrosion products. Corrosion inhibition was determined by the following equation: Corrosion Inhibition=$C_S - C_I/C_S \times 100\%$; where $C_S$=Corrosion rate of uninhibited salt solution (mils per year) and $C_I$=corrosion rate of inhibited salt solution (mils per year). The results of this study are summarized in Table I, below.

TABLE I

| Coupon Insertion Time (Days) | Salt (percent by weight of solution) | Zinc Sulfate (percent by weight of salt) | Sodium Tripolyphosphate (percent by weight of salt) | Corrosion Inhibition* (percent) |
|---|---|---|---|---|
| 49 | 0.40 | 5.0 | 5 | 97 |
| 11 | 0.80 | 5.0 | 5 | 93 |
| 21 | 1.67 | 2.5 | 2.5 | 97 |
| 21 | 0.33 | 2.5 | 2.5 | 93 |
| 30 | 3.0 | 5.0 | 5 | 95 |
| 9** | 3.0 | 5.0 | 5 | 93 |
| 12** | 3.0 | 2.5 | 2.5 | 94 |

*The corrosion inhibition due to a control solution containing the same concentration of salt without inhibition is 0%.
**These data resulted from spray testing of inhibited salt on corrosion coupons. Coupons were compared which were sprayed with the inhibited and uninhibited salt solutions for 10 minutes (about 500 ml of solution) twice per day.

The results summarized in Table I demonstrate that relatively small amounts of the $Zn^{+2}$/tripolyphosphate mixture are highly effective to inhibit corrosion caused by 0.4-3% aqueous salt solutions.

EXAMPLE II

Corrosion Inhibition by Zinc/Hexametaphosphate Mixtures

The inhibition of the corrosion of steel coupons due to exposure to aqueous salt solutions was determined using inhibitors comprising zinc sulfate and sodium hexametaphosphate following the test procedures of Example I. The results of these tests are summarized in Table II, below).

TABLE II

| Coupon Insertion Time | Salt (wt %) | Zinc Sulfate (wt % of salt) | Sodium Hexameta- phosphate (wt % of salt) | Corrosion Inhibition* |
|---|---|---|---|---|
| 30 days | 3.0 | 5.0 | 5.0 | 93 |
| 30 days | 3.0 | 2.5 | 2.5 | 90 |

*3% salt alone = 0% inhibition.

The results summarized on Table II indicate that $Zn^{+2}$/hexametaphosphate mixtures are essentially as effective as $Zn^{+2}$/tripolyphosphate mixtures as corrosion inhibitors.

EXAMPLE III

Corrosion Inhibition by Calcium/Hexametaphosphate Mixtures

The extent of the corrosion of steel coupons due to exposure to water or to aqueous 2% salt solutions for 43 days was determined using calcium chloride, sodium hexametaphosphate or mixtures thereof, following the procedures of Example I. The results of this study are summarized in Table III, below.

TABLE III

| Salt (wt %) | CaCl₂ (wt % of salt) | Sodium Hexa- metaphosphate (wt % of salt) | Corrosion Inhibition* |
|---|---|---|---|
| 0 | 0 | 0 | 58 |
| 2 | 10 | 0 | −22 |
| 2 | 0 | 1.25 | 27 |
| 2 | 10 | 1.25 | 96 |
| 2 | 5 | 0.612 | 89 |
| 2 | 10 | 0.612 | 93 |

*2% salt alone = 0% inhibition.

The results summarized in Table I indicate that mixtures of calcium chloride and sodium hexametaphosphate are highly effective in inhibiting the corrosion of steel caused by 2% aqueous sodium chloride. The facts that (a) 10% calcium chloride causes corrosions, (b) 1.25% sodium hexametaphosphate moderately (27%) inhibits corrosion, while (c) a mixture of 10% calcium chloride and 1.25% sodium hexametaphosphate results in 96% corrosion inhibition clearly demonstrates the synergistic interaction between the divalent metal ion and the polyphosphate.

EXAMPLE IV

Corrosion Inhibition by Magnesium/Hexametaphosphate Mixtures

The extent of corrosion of steel coupons due to exposure to aqueous salt solutions for 43 days was determined using mixtures of magnesium chloride and sodium hexametaphosphate, following the procedures of Example I. The results of this study are summarized in Table IV, below.

TABLE IV

| Salt (wt % of solution) | MgCl₂.6H₂O (wt % of salt) | Sodium Hexa- metaphosphate (wt % of salt) | Corrosion Inhibition* |
|---|---|---|---|
| 2 | 20 | 1.25 | 50 |
| 2 | 10 | 0.625 | 50 |
| 2 | 20 | 0.625 | 51 |
| 3 | 12 | 2.70 | 87** |

*2% salt solution alone = 0% inhibition.
**Spray test following procedures of Ex. 1 (25 days).

The results summarized in Table IV demonstrate that substantial corrosion inhibition can be achieved by employing inhibitor mixtures containing soluble $Mg^{+2}$ and hexametaphosphate.

EXAMPLE V

Corrosion Inhibition by Ca or Mg/Tripolyphosphate Mixtures

The extent of corrosion of steel coupons due to exposure to aqueous 2% salt solutions for 22 days was determined using mixtures of magnesium sulfate or calcium chloride with sodium tripolyphosphate, following the procedures of Example I. The results of this study are summarized on Table V, below.

TABLE V

| Divalent Metal (wt % of salt) | Sodium Tri- polyphosphate (wt % of salt) | Corrosion Inhibition* |
|---|---|---|
| 25% MgSO₄.7H₂O | 5 | 85 |
| 25% MgSO₄.7H₂O | 2.5 | 51 |
| 10% CaCl₂ | 5 | 88 |
| 10% CaCl₂ | 2.5 | 82 |

*2% salt solution alone = 0% inhibition.

The results summarized on Table V demonstrate that substantial corrosion inhibition can be achieved by employing inhibition mixtures containing soluble $Mg^{+2}$ or $Ca^{+2}$ and hexametaphosphate.

The invention has been described with reference to various specific and preferred embodiments and techniques. However, it should be understood that many variations and modifications may be made while remaining within the spirit and scope of the invention.

What is claimed is:

1. A deicing composition consisting essentially of a mixture of a major amount of sodium chloride and a corrosion inhibitor comprising a source of water-soluble $Zn^{+2}$ selected from the group consisting of zinc halide, zinc acetate, zinc nitrate, zinc oxide and zinc sulfate and a hexametaphosphate salt wherein said inhibitor is present in an amount effective to reduce the rate of corrosion of ferrous metals by aqueous sodium chloride solutions.

2. The deicing composition of claim 1 wherein the hexametaphosphate is an alkali metal salt.

3. The deicing composition of claim 1 wherein the hexametaphosphate salt is a sodium salt.

4. The deicing composition of claim 1 wherein the weight ratio of divalent metal ion salt to hexametaphosphate salt is about 30-1:1.

5. A deicing composition comprising a mixture of a major amount of sodium chloride and corrosion inhibitor comprising a source of water-soluble $Mg^{+2}$ and a polyphosphate salt selected from the group consisting of tripolyphosphate, hexametaphosphate and mixtures thereof, wherein said inhibitor is present in an amount effective to reduce the rate of corrosion of ferrous metals by aqueous sodium chloride solutions.

6. The deicing compositions of claim 5 wherein the weight ratio of the source of $Mg^{+2}$ to the polyphosphate salt is about 50-0.5:1.

7. The deicing composition of claim 5 wherein the polyphosphate salt is an alkali metal salt.

8. The deicing composition of claim 7 wherein the polyphosphate salt is a sodium salt.

9. The deicing composition of claim 5 wherein the $Mg^{+2}$ is provided by the salt of a halide, an acetate, a nitrate, an oxide or a sulfate.

10. The deicing composition of claim 5 wherein the weight ratio of $Mg^{+2}$ to polyphosphate salt is about 30-1:1.

11. The deicing composition of claim 5 wherein the polyphosphate salt is a hexametaphosphate.

* * * * *